(12) United States Patent
Mitra et al.

(10) Patent No.: US 11,049,041 B2
(45) Date of Patent: Jun. 29, 2021

(54) ONLINE TRAINING AND UPDATE OF FACTORIZATION MACHINES USING ALTERNATING LEAST SQUARES OPTIMIZATION

(71) Applicant: Adobe Inc., San Jose, CA (US)

(72) Inventors: Saayan Mitra, San Jose, CA (US); Xueyu Mao, Austin, TX (US); Viswanathan Swaminathan, Saratoga, CA (US); Somdeb Sarkhel, San Jose, CA (US); Sheng Li, San Jose, CA (US)

(73) Assignee: Adobe Inc., San Jose, CA (US)

( * ) Notice: Subject to any disclaimer, the term of this patent is extended or adjusted under 35 U.S.C. 154(b) by 678 days.

(21) Appl. No.: 15/963,737

(22) Filed: Apr. 26, 2018

(65) Prior Publication Data

US 2019/0332971 A1    Oct. 31, 2019

(51) Int. Cl.
*G06N 20/00* (2019.01)
*G06F 17/16* (2006.01)
*G06N 5/04* (2006.01)

(52) U.S. Cl.
CPC ............. *G06N 20/00* (2019.01); *G06F 17/16* (2013.01); *G06N 5/04* (2013.01)

(58) Field of Classification Search
CPC ...................................................... G06N 20/00
USPC ...................................................... 706/15, 45
See application file for complete search history.

(56) References Cited

U.S. PATENT DOCUMENTS

| 2014/0177390 A1* | 6/2014 | Can ........................ G01V 1/302 367/73 |
| 2018/0232700 A1* | 8/2018 | Li ........................... G06N 5/04 |

OTHER PUBLICATIONS

Rendle, Steffen. "Factorization machines", Data Mining (ICDM), 2010 IEEE 10th International Conference on. IEEE, 2010.
Rendle, S., et al. "Fast context-aware recommendations with factorization machines", Proceedings of the 34th International ACM SIGIR conference on Research and development in Information Retrieval. ACM, 2011.
Blondel, M., et al. "Polynomial Networks and Factorization Machines: New Insights and Efficient Training Algorithms", International Conference on Machine Learning. 2016.
Blondel, M., et al. "Higher-Order Factorization Machines", 2016, NIPS, pp. 3351-3359.

* cited by examiner

*Primary Examiner* — David R Vincent
(74) *Attorney, Agent, or Firm* — Finch & Maloney PLLC (57) ABSTRACT

Techniques are disclosed for training of factorization machines (FMs) using a streaming mode alternating least squares (ALS) optimization. A methodology implementing the techniques according to an embodiment includes receiving a datapoint that includes a feature vector and an associated target value. The feature vector includes user identification, subject matter identification, and a context. The target value identifies an opinion of the user relative to the subject matter. The method further includes applying an FM to the feature vector to generate an estimate of the target value, and updating parameters of the FM for training of the FM. The parameter update is based on application of a streaming mode ALS optimization to: the datapoint; the estimate of the target value; and to an updated summation of intermediate calculated terms generated by application of the streaming mode ALS optimization to previously received datapoints associated with prior parameter updates of the FM.

20 Claims, 7 Drawing Sheets

FIG. 1

S Matrix
200

| Feature Vectors 202 | Users 204 | | | | Films 206 | | | Platforms 208 | | | Locations 210 | | Target 212 |
|---|---|---|---|---|---|---|---|---|---|---|---|---|---|
| | $U_1$ | $U_2$ | $U_3$ | $U_4$ | $F_1$ | $F_2$ | $F_3$ | $P_1$ | $P_2$ | $P_3$ | $L_1$ | $L_2$ | |
| $\mathbf{x}^{(1)}$ | $x_1^{(1)}$ | ... | | $x_4^{(1)}$ | $x_5^{(1)}$ | ... | $x_7^{(1)}$ | $x_8^{(1)}$ | ... | $x_{10}^{(1)}$ | $x_{11}^{(1)}$, | $x_{12}^{(1)}$ | $y^{(1)}$ |
| $\mathbf{x}^{(2)}$ | $x_1^{(2)}$ | ... | | $x_4^{(2)}$ | $x_5^{(2)}$ | ... | $x_7^{(2)}$ | $x_8^{(2)}$ | ... | $x_{10}^{(2)}$ | $x_{11}^{(2)}$, | $x_{12}^{(2)}$ | $y^{(2)}$ |
| $\mathbf{x}^{(3)}$ | $x_1^{(3)}$ | ... | | $x_4^{(3)}$ | $x_5^{(3)}$ | ... | $x_7^{(3)}$ | $x_8^{(3)}$ | ... | $x_{10}^{(3)}$ | $x_{11}^{(3)}$, | $x_{12}^{(3)}$ | $y^{(3)}$ |
| ⋮ | | | | | | | | | | | | | |
| $\mathbf{x}^{(M)}$ | $x_1^{(M)}$ | ... | | $x_4^{(M)}$ | $x_5^{(M)}$ | ... | $x_7^{(M)}$ | $x_8^{(M)}$ | ... | $x_{10}^{(M)}$ | $x_{11}^{(M)}$, | $x_{12}^{(M)}$ | $y^{(M)}$ | dimension n

FIG. 2

S Matrix (populated)
300

| Feature Vectors 202 | Users 204 $U_1\ U_2\ U_3\ U_4$ | Films 206 $F_1\ F_2\ F_3$ | Platforms 208 $P_1\ P_2\ P_3$ | Locations 210 $L_1\ L_2$ | Target 212 |
|---|---|---|---|---|---|
| $x^{(1)}$ | 1 0 0 0 | 1 0 0 | 0 1 0 | 0 1 | 0.9 |
| $x^{(2)}$ | 1 0 0 0 | 0 1 0 | 1 0 0 | 0 1 | 0.25 |
| $x^{(3)}$ | 0 1 0 0 | 0 1 0 | 0 0 1 | 0 1 | 1.0 |
| ⋮ | | | | | |
| $x^{(M)}$ | 0 0 0 1 | 1 0 0 | 1 0 0 | 0 1 | 0.75 |

ONLINE TRAINING AND UPDATE OF FACTORIZATION MACHINES USING ALTERNATING LEAST SQUARES OPTIMIZATION

FIELD OF THE DISCLOSURE

This disclosure relates to factorization machines configured to generate context aware recommendations, and more particularly, to techniques for training and updating the factorization machines using a streaming mode alternating least squares optimization.

BACKGROUND

Context aware recommender systems are increasingly employed to provide personalized recommendations to users or to predict the reactions of users to a given subject or situation. Many such recommender systems employ factorization machines which are typically trained in a batch mode, which is to say that the prediction model is trained on large datasets every few hours or days. In these systems, the trained models can become stale and fail to capture trends as they are evolving in real-time. This can be a particular problem in use cases such as sports or news, where it is important to react quickly to shifting trends to make real-time recommendations based on the current viewing patterns observed over large numbers of users. Another disadvantage of batch mode training is the significant processing time and memory storage required to deal with the large datasets.

DETAILED DESCRIPTION

As noted previously, the use of factorization machines (FMs) for generating context aware predictions and recommendations, using existing batch mode training techniques, presents a number of problems in that the training models can become stale and may fail to capture trends as they are evolving in real-time. Additionally, batch mode training can require significant processing time and memory storage requirements to deal with the large data sets in each batch training session. To this end, it would be desirable to have a system that is capable of training and updating the FM in a more efficient, incremental, and continuous fashion, based on each newly received datapoint from a stream of data, without the need to perform extensive re-calculations based on large volumes of previously received historical data. Such a system, which may be referred to herein as an "online" training system, can enable the FM to capture dynamic information from streaming data sources in a real-time fashion by performing a single processing pass on each datapoint contemporaneously with datapoint receipt.

Thus, techniques are disclosed for online training and updating of an FM using a streaming mode alternating least squares (ALS) optimization which updates parameters of the FM, as and when each new datapoint is received. In more detail, and in accordance with an embodiment of the present disclosure, an FM training system is configured to receive a datapoint from the data stream. The datapoint includes a feature vector and an associated target value. The feature vector includes a user identification, a subject matter identification (e.g., a movie, a book, a web page), and a context (e.g., a plurality of associated information). The context may include such additional information as, for example, the platform through which the user experiences the subject matter, the location of the user, the mood of the user, and/or identification of companions of the user that are present during the experience, to name a few example contextual parameters. Additional contextual parameters may include any form of user metadata (e.g., demographics, etc.), metadata associated with the subject matter (e.g., category, genre, author, etc.), and data associated with the session (e.g., device, browser, date, time of day, etc.). The target value identifies an opinion of the user relative to the subject matter, such as, for example, a level of approval or disapproval. The system is further configured to apply an FM model to the feature vector to generate an estimate of the target value and to calculate an error term as the difference between the actual target value in the estimate. The system is configured to then update the parameters of the FM to further the training of the FM based on the new (current) datapoint. The parameter update is accomplished through an application of the streaming mode ALS optimization to the current datapoint, the error term, and an updated cumulative summation of previously calculated intermediate terms generated by the streaming mode ALS optimization in connection with prior parameter updates associated with previously received datapoints, as will be described in greater detail below.

In an example use case the trained FM is applied to a hypothetical feature vector to predict a target value associated with that hypothetical feature vector. Thus, the trained FM may be used to predict or estimate a user's reaction to a new subject matter or situation and to generate a recommendation to the user based on that prediction. Such predictions may be used for contextual advertising purposes, including predicting user web page views and mouse clicks in a given context and targeting which context will generate the maximum views and clicks. Recommendations may include, for example, products and automated generation of personalized playlists including movies, videos, music, books, as well as products, advertisements, events, identification of potential friends, and the like.

Thus, the foregoing framework provides a system to enable online training of a factorization machine using a streaming mode alternating least squares optimization, in a relatively efficient fashion, compared to existing batch mode training methods that operate on large quantities of data at relatively infrequent intervals. The disclosed techniques improve prediction performance by enabling the factorization machine to rapidly adapt to changing trends in the streaming data. Numerous configurations and variations will be apparent in light of this disclosure.

System Architecture

Figure 1:
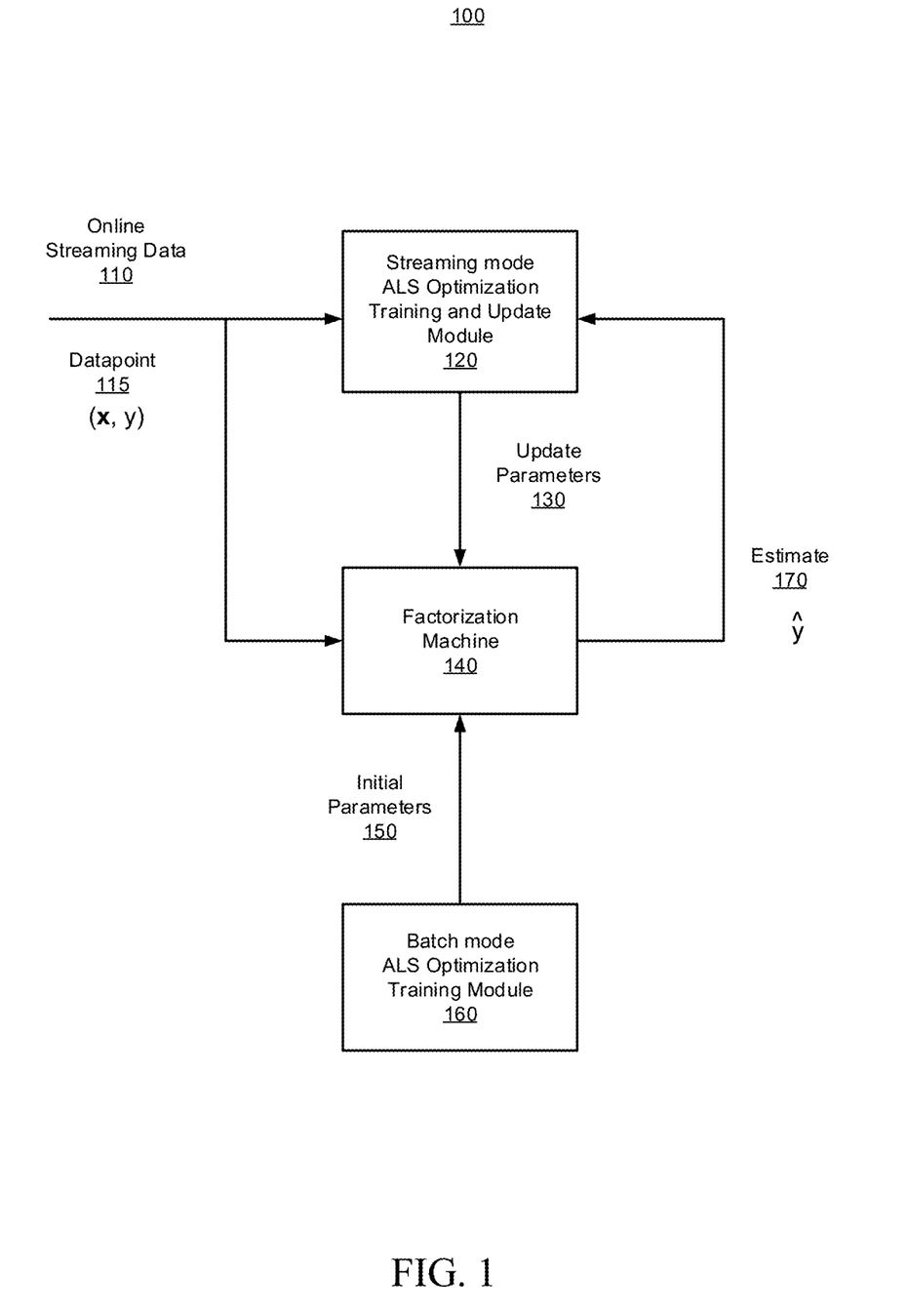
FIG. 1 is a block diagram of a system for training and updating a factorization machine, configured in accordance with an embodiment of the present disclosure.

FIG. 1 is a block diagram of a system 100 for training and updating a factorization machine, configured in accordance with an embodiment of the present disclosure. As can be seen, the system 100 comprises a streaming mode ALS optimization training and update module 120, factorization machine 140, and batch mode ALS optimization training module 160, the operations of which will be described in greater detail below. In one embodiment, and at a high level of description, at a given instant in time, a new datapoint 115, comprising a feature vector x and associated target value y, is received by the system 100 from a source of online streaming data 110. This new datapoint 115 becomes the current datapoint. The factorization machine 140, which implements a type of low-rank multi-linear modeling, is configured to generate an estimated target value ŷ 170 based on the current feature vector x (i.e., the feature vector of the current datapoint). An error term can then be calculated as the difference between the received target value y and the estimated target value ŷ. The streaming mode ALS optimization training and update module 120 is configured to provide updated parameters 130 to the FM to incrementally improve the training of the FM based on the current datapoint, the calculated error, and a cumulative summation of prior intermediate ALS calculations. This embodiment provides a continuous learning framework. FM parameters to be updated include a global bias parameter which captures the general bias of the data, scalar weights associated with each feature vector element to capture the relative importance of that element, and interaction parameters which capture the relationships between elements, as will be described in greater detail below. The batch mode ALS optimization training module 160 is configured to pre-train or bootstrap the FM with an initial set of parameters 150, for example using a batch mode version of the ALS optimization, as will also be described below.

In some embodiments, the datapoint 115 may include the feature vector x without the associated target value y. In this case, the FM may be employed to predict a target value, using the current FM parameters. The true target value can be provided as or otherwise derived or inferred from feedback from the user at a future time, at which point an error can be calculated between the predicted target value and the true target value, for use in updating the FM parameters. For example, in some embodiments, the true target value may be inferred from measurement of time spent on a web page, mouse clicks, purchases, views, and other such activities of the user. In a more general sense, the true target value is based on feedback from the user, whether that feedback be directly provided by the user, derived from input provided by the user, or inferred from action or inaction by the user. In some such cases, note the input inferred from the user may be based on an omission or failure to timely provide an affirmative input.

Figure 2:
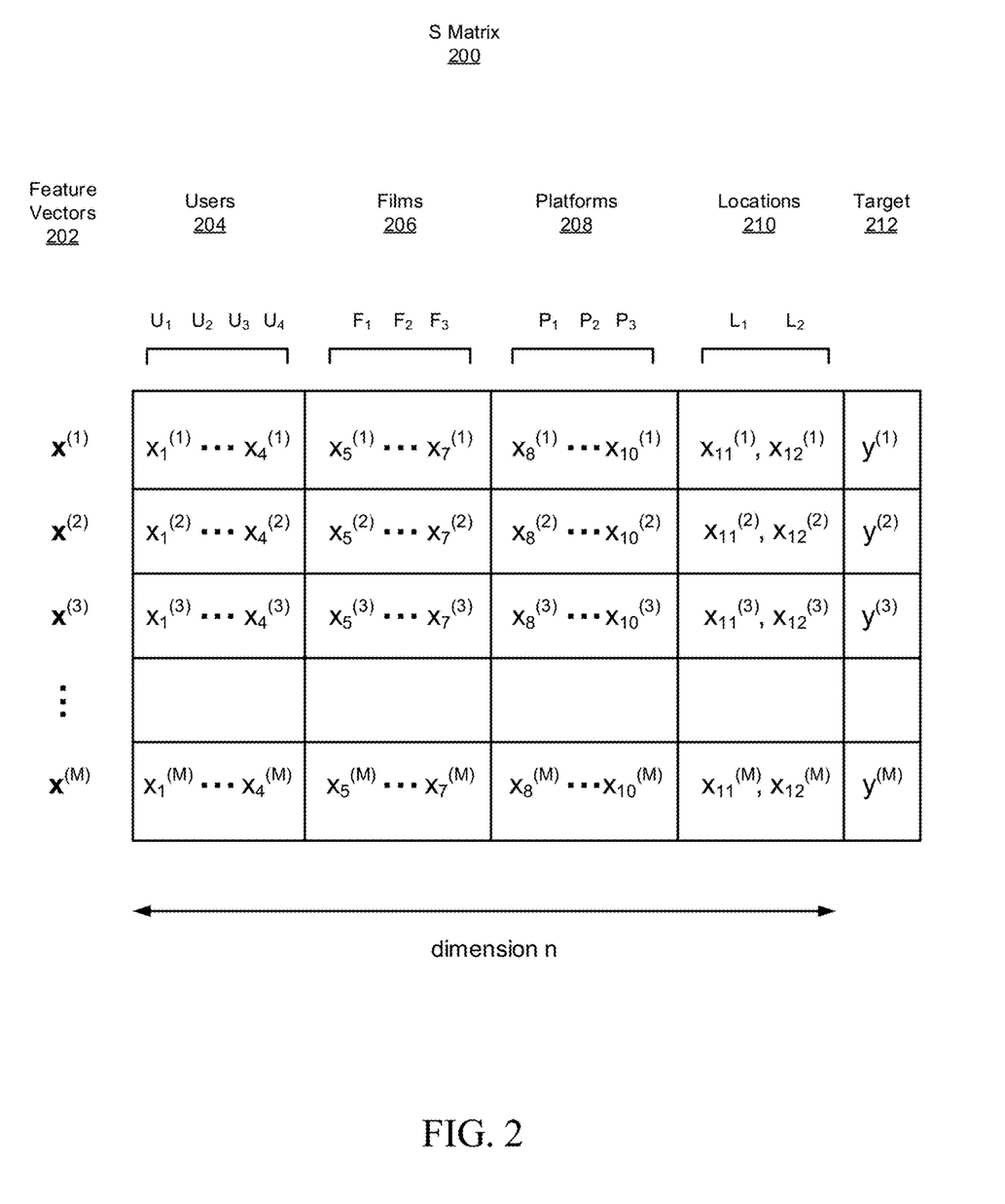
FIG. 2 illustrates a matrix format for training data including feature vectors and target values, in accordance with an embodiment of the present disclosure.
Figure 3:
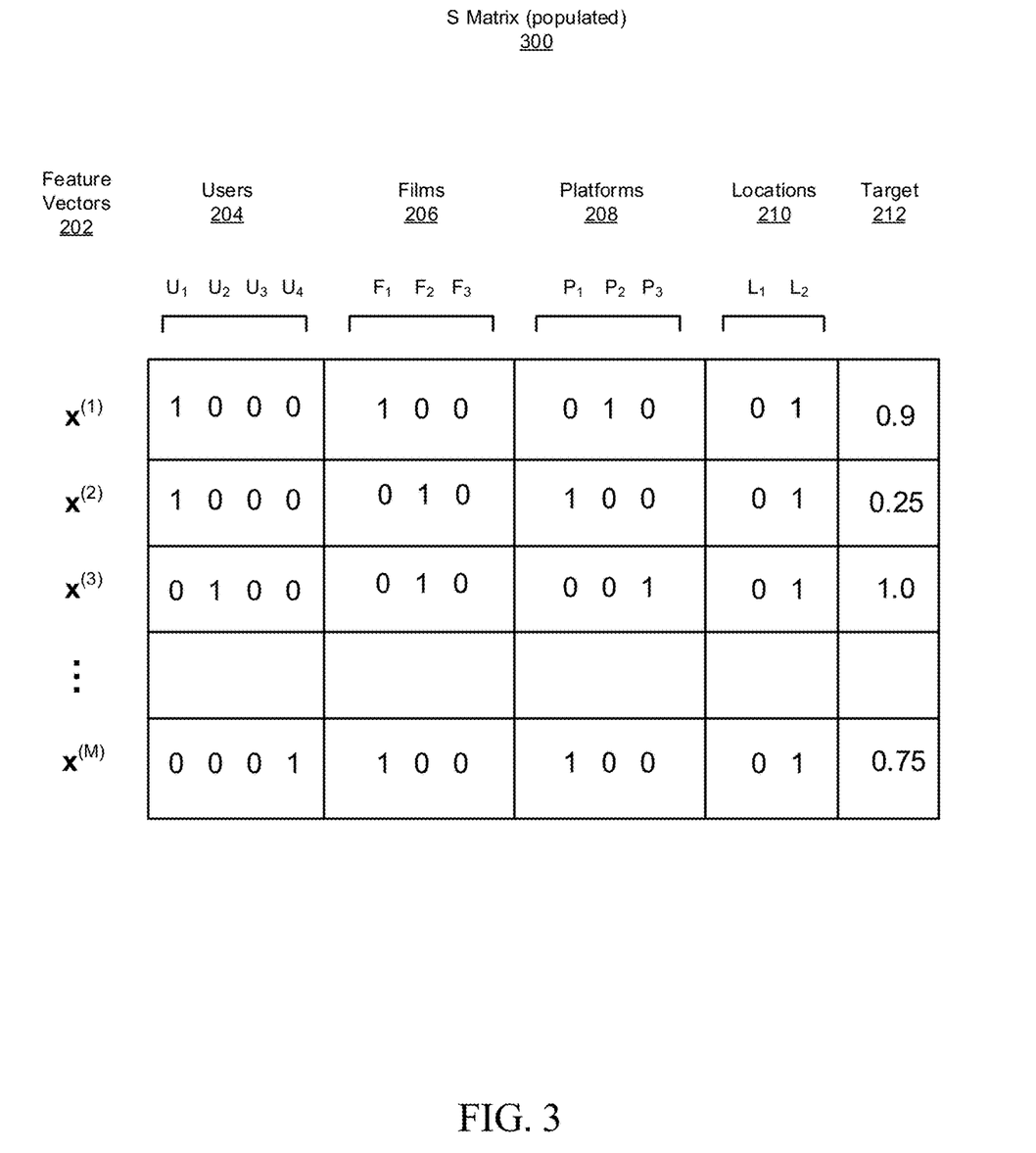
FIG. 3 illustrates an example training data matrix, in accordance with an embodiment of the present disclosure.

A description of the training data is provided in FIGS. 2 and 3 for consideration prior to engaging in a more detailed explanation of the FM and the ALS optimization techniques. FIG. 2 illustrates a matrix format 200 for the training data, including feature vectors and target values, in accordance with an embodiment of the present disclosure. FIG. 3 provides an example of the training data matrix populated with sample values 300, in accordance with an embodiment of the present disclosure.

Turning first to FIG. 2, each row of the matrix S 200 represents a datapoint that includes a feature vector x 202 and associated target value y 212. There are M datapoints shown in the matrix S, each datapoint received at a given time t, where the topmost row (1) represents the current datapoint, the second row (2) represents the previous datapoint, and so on. In practice there may be millions, or more, of datapoints (rows) received from the stream of data, and the datapoints may be received at rates of one datapoint per second, or more frequently, depending on the application.

Each feature vector x includes a number of elements $x_i$. The number of elements is referred to as the dimension (n) of the feature vector. In this example, the first four elements encode the identity 204 of the user ($U_1$-$U_4$). The next three elements encode the subject matter as an identification 206 of a film ($F_1$-$F_3$) that was watched by the user. The following three elements encode the platform 208 ($P_1$-$P_3$) on which the movie was watched (e.g., television, iPad, iPhone), and the final two elements encode the location 210 ($L_1$, $L_2$) where the movie was watched. Thus, the dimension, n, is 12 in this example. The target y 212, in this example, encodes a numerical rating or ranking of the movie as provided by the identified user. It will be appreciated that this is a simplified example and that in practice the number of users, subject matters, platforms, and locations may be relatively large, and that additional or different contextual data may be provided, such as, for example, a date and time, an indication of the mood of the user, the identities of companions of the user participating in the event/experience, etc. Also, the subject matter is not limited to movies, but may encompass almost any matter including music, television, news, sports, books, webpages, etc.

Turning now to FIG. 3, a populated S matrix 300 is shown with illustrative sample values. The user field 204 of the first feature vector $x^{(1)}$ (e.g., the current datapoint) is encoded as {1, 0, 0, 0} to identify the user as $U_1$. Similarly, for the first feature vector, the films field 206 is encoded as {1, 0, 0} to identify film $F_1$, the platforms field 208 is encoded as {0 1, 0} to identify platform $P_2$, and the locations field 210 is encoded as {0, 1} to identify location $L_2$. Each row will generally associate one user with some combination one film on one platform at one location. The target field 212 indicates that user 1 rated film 1 as 0.9 on a normalized scale from 0 to 1, which is to say highly favorable. Additional datapoints are shown. For example, the feature vector of the M-th datapoint indicates user 4 viewing film 1, on platform 1, at location 2, and the associated target value indicates a rating of 0.75.

As mentioned previously, the S matrix can grow to be quite large, which is one of the disadvantages of FM parameter calculation using batch mode ALS optimization, which operates on the entire S matrix (or a large portion thereof) representing data collected over an extended period of time at periodic infrequent intervals (e.g., hours or days). In contrast, streaming mode ALS optimization operates only on the current datapoint in combination with a relatively small cached store of cumulative summations of intermediate calculations generated from previous datapoints, as will be described in greater detail below.

Returning now to FIG. 1, and as mentioned previously, the factorization machine 140 is configured to generate an estimated target value ŷ 170 based on the current feature vector x of the current datapoint 115. In one embodiment, this estimation can be described by the following equation:

$$\hat{y}(t) = w_0(t-1) + \sum_{i=1}^{n} w_i(t-1)x_i(t) + \sum_{i=1}^{n}\sum_{j=i+1}^{n} \langle v_i(t-1), v_j(t-1)\rangle x_i(t)x_j(t)$$

where $x_i(t)$ and $x_j(t)$ are the i-th and j-th elements of feature vector x at the current time t, $\hat{y}(t)$ is the estimated target value at the current time t, and $\{w_0(t-1), w_i(t-1), v_i(t-1), v_j(t-1)\}$ are the parameters of the FM which were calculated (updated) at time t−1 from the previous datapoint, as will be explained in greater detail below. The global bias parameter $w_0$ captures the general bias of the data, the scalar weights $w_i$ associated with each feature vector element capture the relative importance of that element, and the interaction parameter vectors $v_i$, $v_j$ capture the relationships between elements i and j. Each interaction parameter vector $v_i$, $v_j$ is of length k (also referred to as the rank), and so the total size of the interaction parameter vectors is n×k. The rank is determined heuristically and is typically a small value chosen to be in the range of four to eight. The $\langle , \rangle$ operator in the above equation represents the dot product between vectors $v_i$ and $v_j$.

Figure 4:
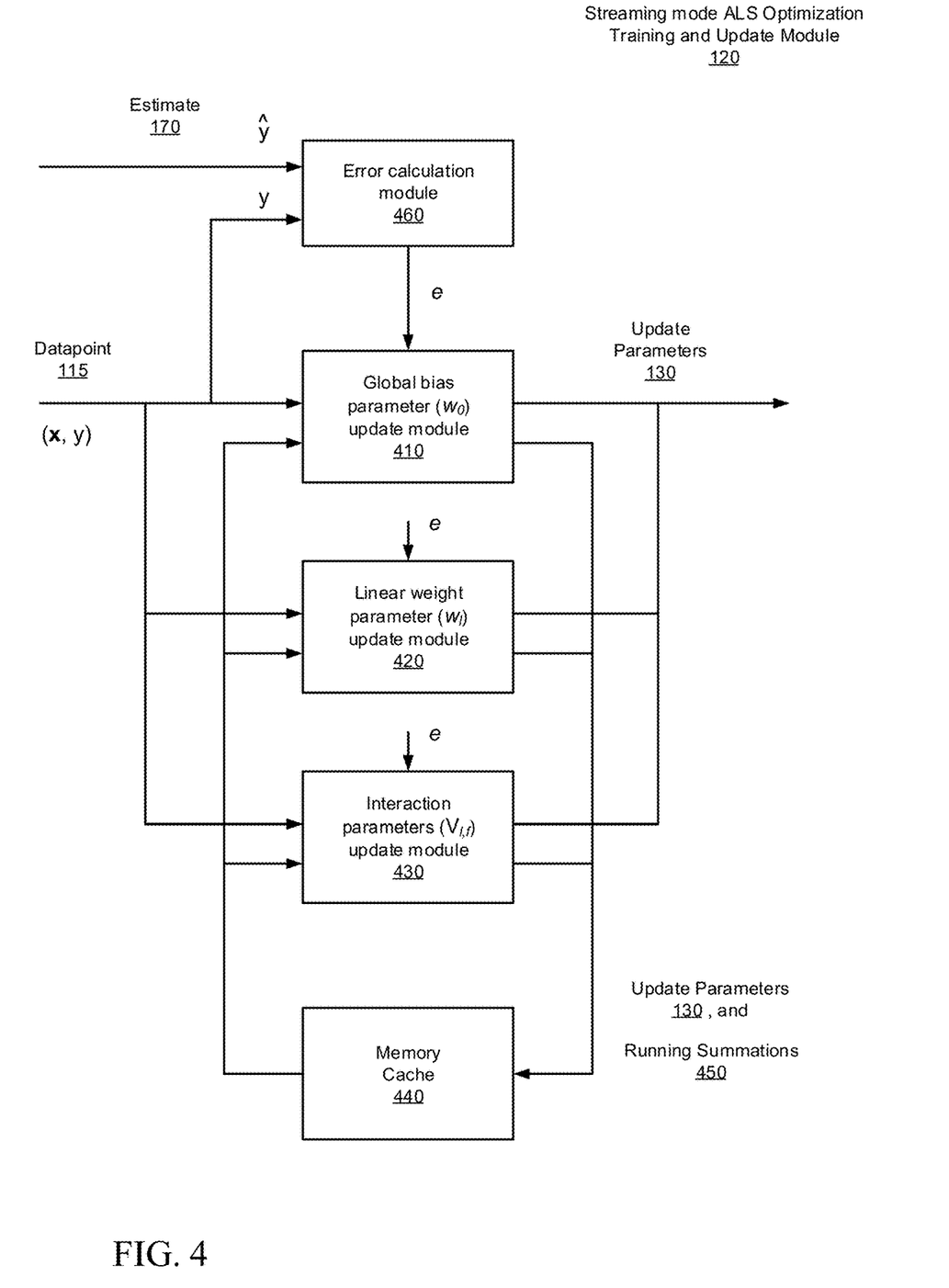
FIG. 4 is a more detailed block diagram of a streaming mode alternating least squares optimization module, configured in accordance with an embodiment of the present disclosure.

FIG. 4 is a more detailed block diagram of a streaming mode ALS optimization training an update module 120, configured in accordance with an embodiment of the present disclosure. As can be seen, module 120 comprises a global bias parameter update module 410, a linear weight parameter update module 420, and an interaction parameter update module 430, configured to generate updated parameters 130 for the FM. Module 120 also comprises an error calculation module 460, and a memory cache 440.

The memory cache 440 is configured to store the currently updated parameters 130 (and running summations of intermediate calculations 450, as will be described below) for use in calculating and updating parameters based on the next received datapoint.

The error calculation module 460 is configured to calculate an error term e(t) as the difference between the estimated target value $\hat{y}$ 170 and the received target value y of datapoint 115:

$$e(t) = \hat{y}(t) - y(t)$$

This error term is provided to modules 410, 420, and 430 for use in the calculation of the FM parameters.

Global bias parameter update module 410 is configured to calculate an update to the global bias parameter for the FM. In some embodiments, the calculation may be performed according to the following equation:

$$w_0(t) = w_0(t-1) - \frac{e(t)}{|S(t)| + \lambda(w_0)}$$

where $w_0(t)$ is the updated global bias parameter, $w_0(t-1)$ is the previous global bias parameter, e(t) is the error term, and |S(t)| is the number of datapoints that have been processed to this point, which is equivalent to the number of rows that would be in the S matrix if all of the datapoints were being saved in the S matrix (as would be the case for example in batch mode processing). Additionally, $\lambda(w_0)$ is a global bias regularization parameter that is heuristically chosen to reduce overfitting of the data.

Linear weight parameter update module 420 is configured to calculate an update to the n linear weight parameters $w_l$ for the FM. In some embodiments, the calculation may be performed according to the following equation:

$$w_l(t) = w_l(t-1) - \frac{e(t)x_l(t)}{\sum_{i \in S(t)} x_l(i)^2 + \lambda(w_l)}$$

where $w_l(t)$ is the updated linear weight parameter for the l-th element of x (the current feature vector), $w_l(t-1)$ is the corresponding previous linear weight parameter, e(t) is the error term, and $x_l(t)$ is the l-th element of x. The term $\sum_{i \in S(t)} x_l(i)^2$ is a cumulative sum of the squares of the l-th element of the x feature vector over time, where S(t) is the set of all received data points up to and including time t. This term is one of the previously mentioned "cumulative summation of calculated intermediate ALS terms." Additionally, $\lambda(w_l)$ is a regularization parameter that is heuristically chosen to reduce overfitting of the data for the l-th linear weight.

Interaction parameter update module 430 is configured to calculate an update to the n interaction parameter vectors $v_l$ (each of length k) for the FM. In some embodiments, the calculation may be performed according to the following equation:

$$h_{l,f}(t) = x_l(t) \sum_{i=1, i \neq l}^{n} v_{i,f}(t-1)x_i(t)$$

$$v_{l,f}(t) = v_{l,f}(t-1) - \frac{e(t)h_{l,f}(t)}{\sum_{i \in S(t)} h_{l,f}(i)^2 + \lambda(v_{l,f})}$$

Where $v_{l,f}(t)$ is the f-th element of the updated interaction parameter vector $v_l$, where $v_l$ is associated with the l-th element of x (the current feature vector) and $v_{l,f}(t-1)$ is the corresponding previous interaction parameter vector. In keeping with previous notation, $x_l(t)$ is the l-th element of the current feature vector x, and $x_i(t)$ is the i-th element of the current feature vector x, and e(t) is the error term. The term $\sum_{i \in S(t)} h_{l,f}(i)^2$ is a cumulative sum of the squares of the defined function $h_{l,f}(t)$ over time, which is another one of the previously mentioned "cumulative summation of calculated intermediate ALS terms." Additionally, $\lambda(v_{l,f})$ is a regularization parameter that is heuristically chosen to reduce overfitting of the data for the (l,f)-th interaction parameter.

It will be appreciated that the cumulative sums of intermediate calculated terms, $\sum_{i \in S(t)} x_l(i)^2$ and $\sum_{i \in S}(t) h_{l,f}(i)^2$, employed in the above calculations provide an efficient mechanism to capture an approximation of the relevant characteristics of the historical data (e.g., previous datapoints), eliminating the requirement to store and re-process all of the historical data as each new streaming datapoint is received. Thus, in some embodiments, the memory cache 440 need only be large enough to store the n values of $\sum_{i \in S(t)} x_l(i)^2$, and the (n×k) values of $\sum_{i \in S(t)} h_{l,f}(i)^2$. In some embodiments, the memory cache 440 may also be used to store the previously calculated parameters $w_0(t-1)$, $w_l(t-1)$, and $v_{l,f}(t-1)$. Thus, the storage cost (e.g., size of the memory cache) is independent of the number of datapoints.

Returning again to FIG. 1, the FM 140 is initialized prior to operation in the online streaming data mode. Batch mode ALS optimization training module 160 is configured to perform this initialization or pre-training, employing a batch mode ALS optimization applied to a selected subset of training data, or using other known techniques in light of the present disclosure, including the use of random initialization values. In some embodiments, a pre-trained model, for example from operation conducted on a previous day, can be used to bootstrap the model for the current day.

Figure 5:
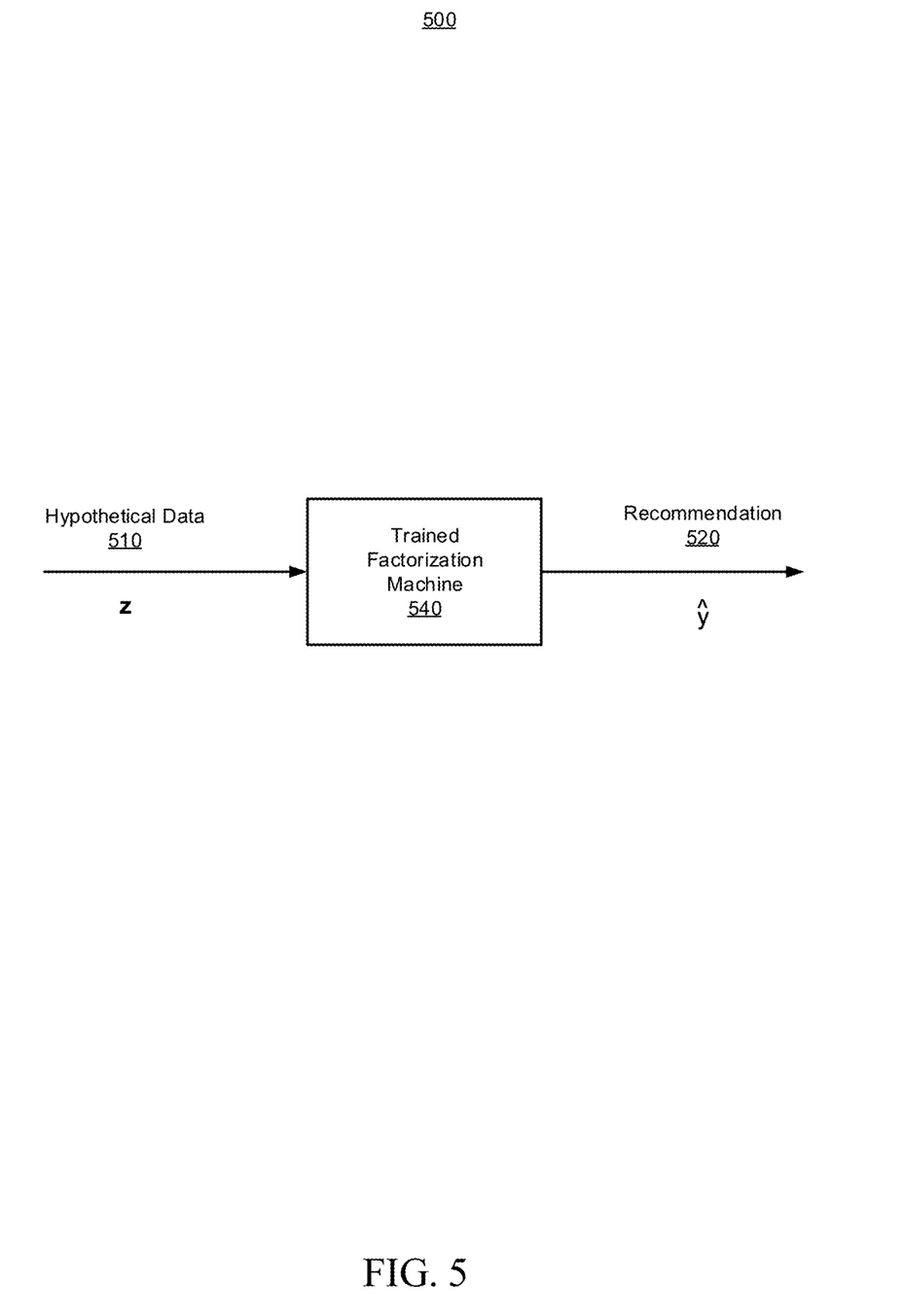
FIG. 5 illustrates the operation of a trained factorization machine, configured in accordance with an embodiment of the present disclosure.

FIG. 5 illustrates the operation 500 of a trained factorization machine 540, configured in accordance with an embodiment of the present disclosure. The FM 540, which is being continuously trained on each new received datapoint as previously described, may be used to generate or serve a recommendation ŷ 520 based on a hypothetical feature vector z 510. For example, a hypothetical feature vector may include a user, subject matter, and/or context combination that has not been previously seen in the streaming data. The trained FM 540, however, can generate a context aware estimate of the reaction or rating of the user to the new subject matter, based on learned relationships between that user and other users and the ratings which other users have given to that subject matter or similar subject matters in similar contexts, from previously captured data.

In some embodiments, the calculation may be performed according to the following equation:

$$\hat{y} = w_0(t) + \sum_{i=1}^{n} w_i(t) z_i + \sum_{i=1}^{n} \sum_{j=i+1}^{n} \langle v_i(t), v_j(t) \rangle z_i z_j$$

where $z_i$ and $z_j$ are elements of the hypothetical feature vector z, ŷ is the estimation or prediction, and $\{w_0, w, v\}$ are the current parameters of the trained FM.

Methodology

Figure 6:
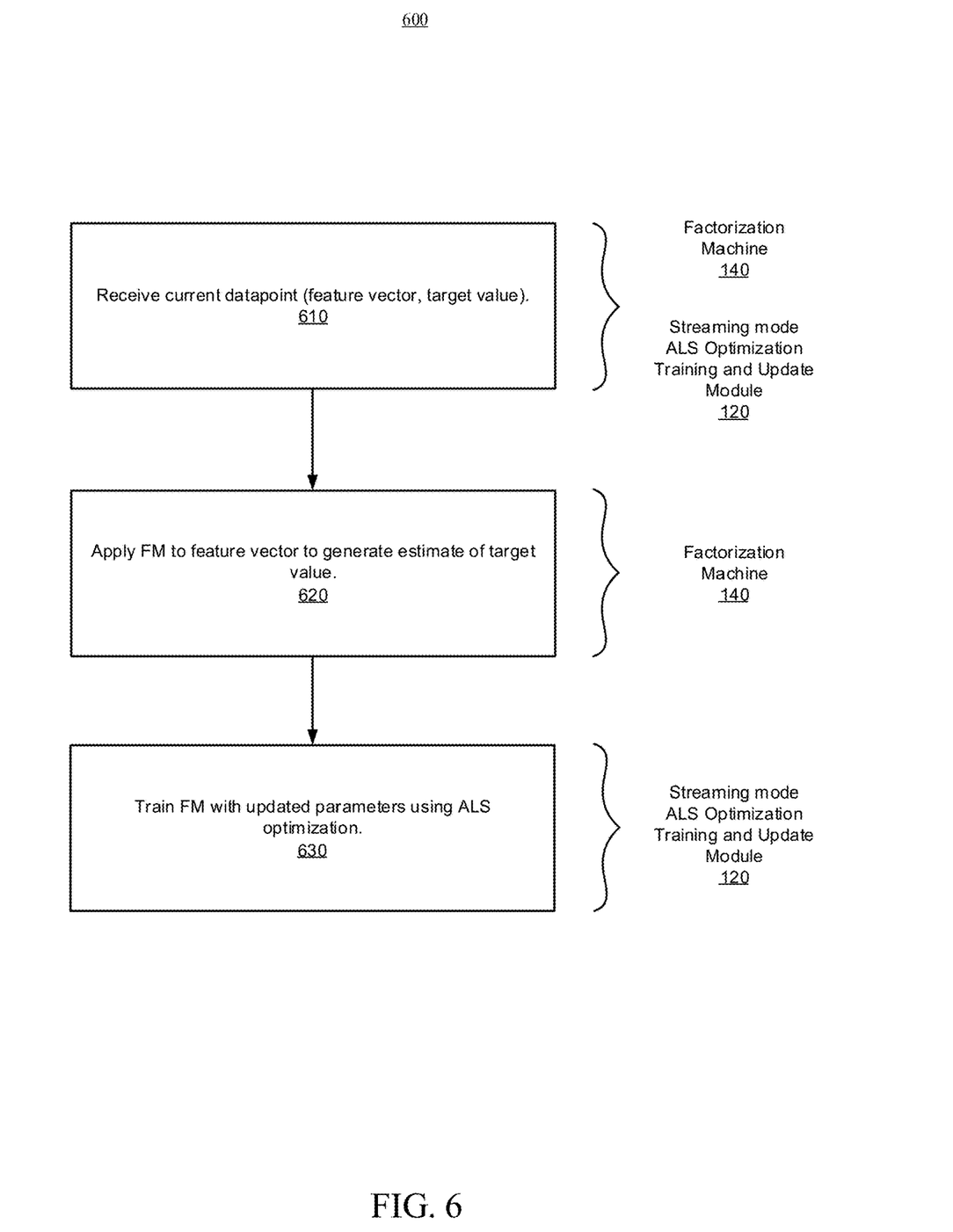
FIG. 6 is a flowchart illustrating a method for training a factorization machine, in accordance with an embodiment of the present disclosure.

FIG. 6 is a flowchart illustrating a method 600 for online training of a factorization machine using a streaming mode alternating least squares optimization, in accordance with an embodiment of the present disclosure. The streaming mode ALS techniques described herein provide for the FM to be incrementally adapted and improved, for example in real-time, through training updates based on each new received datapoint in a stream of datapoints. As can be seen, the method is described with reference to the configuration of streaming mode ALS optimization training and update module 120, factorization machine 140, and batch mode ALS optimization training module 160, of FIGS. 1 and 4. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 610, by receiving a current datapoint from a stream of datapoints. For training purposes, the datapoint includes a feature vector and an associated target value. The feature vector includes a user identification, a subject matter identification (e.g., a movie, a book, a web page), and a context. The context may include additional information such as, for example, the platform through which the user experiences the subject matter, the location of the user, the mood of the user, and/or identification of companions of the user, etc. The target value identifies an opinion or propensity of the user relative to the subject matter and may be expressed or represented in any suitable manner such as a numerical value.

The method continues, at operation 620, by applying the FM to the feature vector to generate an estimate of the target value. The difference between the estimated target value and the actual target value is calculated and used as an error term.

At operation 630, the parameters of the FM are updated to further the training of the FM. The update is based on an application of a streaming mode alternating least squares (ALS) optimization to the current datapoint, the error term, and an updated running summation of intermediate calculated terms generated in connection with the application of the streaming mode ALS optimization to previously received datapoints to perform prior parameter updates of the FM. In some embodiments, the parameters to be updated include a global bias parameter, linear weight parameters, and interaction parameters, as previously described.

In some embodiments, additional operations are performed. For example, in one embodiment, the trained FM is applied to a hypothetical feature vector to generate a predicted target value associated with the hypothetical feature vector. Thus, the trained FM may be used to predict or estimate a user's reaction to a new subject matter or situation and to generate a recommendation to the user based on the prediction. Such a recommendation may include, for example, a product, a playlist, or a targeted advertisement.

Additionally, in some embodiments, the FM may be initialized using a batch mode application of the ALS optimization applied to an historical collection of feature vectors and associated target values.

Example Platform

Figure 7:
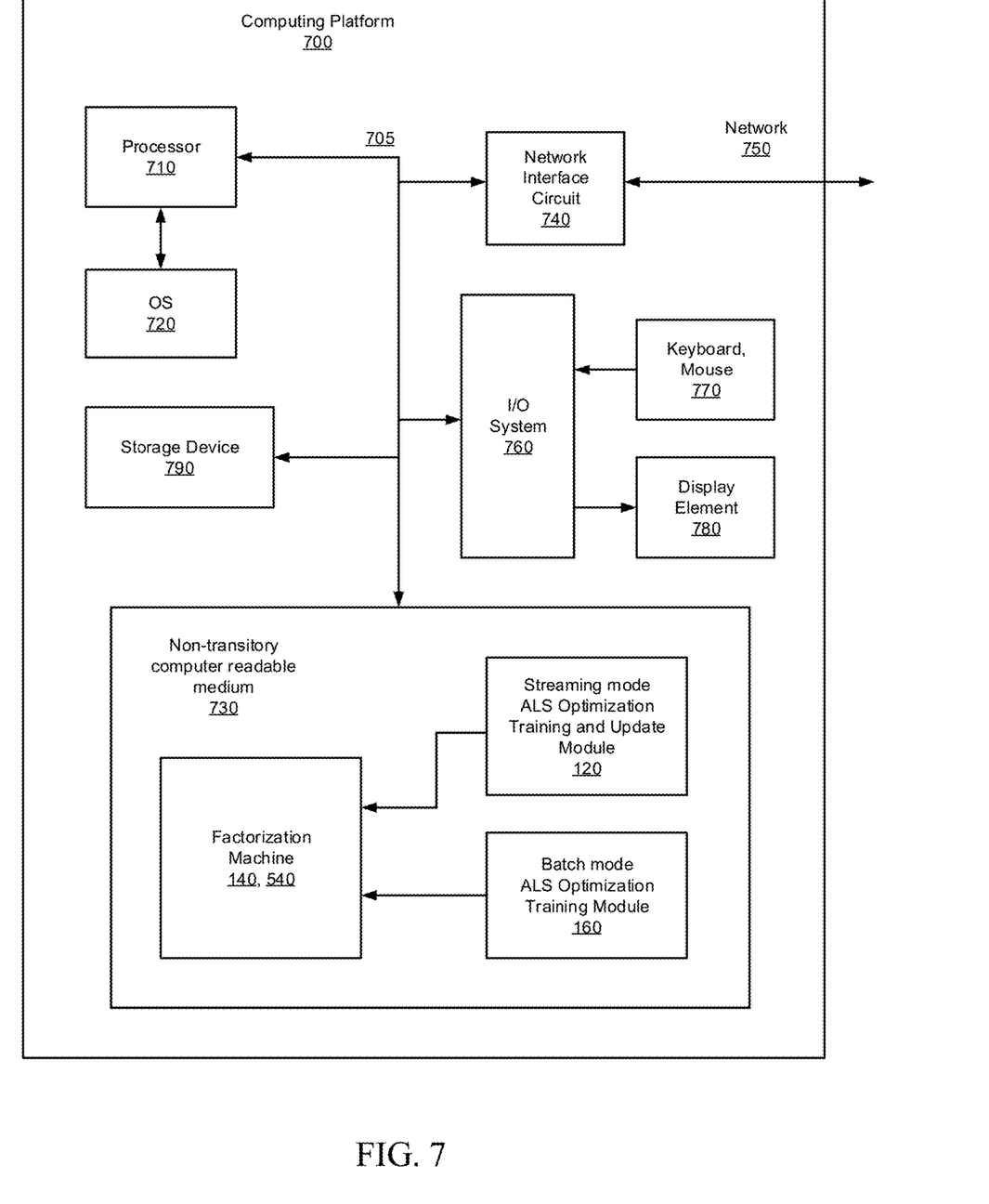
FIG. 7 is a block diagram schematically illustrating a computing platform configured to perform any of the techniques as variously described in this disclosure, configured in accordance with an embodiment of the present disclosure.

FIG. 7 is a block diagram schematically illustrating a computing platform or device 700 used to perform any of the techniques as variously described in this disclosure. For example, in some embodiments, the system for online training and updating of factorization machines (FMs) of FIGS. 1, 4 and 5, or any portions thereof, and the methodologies of FIG. 7, or any portions thereof, are implemented in the computing platform 700. In some embodiments, the computing platform 700 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 700 includes one or more storage devices 790 and/or non-transitory computer-readable media 730 having encoded thereon one or more computer-executable instructions or software for implementing techniques as variously described in this disclosure. In some embodiments, the storage devices 790 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 790 includes other types of memory as well, or combinations thereof. In one embodiment, the storage device 790 is provided on the computing platform 700. In another embodiment, the storage device 790 is provided separately or remotely from the computing platform 700. The non-transitory computer-readable media 730 include, but are not limited to, one or more types of hardware memory, non-transitory tangible media (for example, one or more magnetic storage disks, one or more optical disks, one or more USB flash drives), and the like. In some embodiments, the non-transitory computer-readable media 730 included in the computing platform 700 store computer-readable and computer-executable instructions or software for implementing various embodiments. In one embodiment, the computer-readable media 730 are provided on the computing platform 700. In another embodiment, the computer-readable media 730 are provided separately or remotely from the computing platform 700.

The computing platform 700 also includes at least one processor 710 for executing computer-readable and computer-executable instructions or software stored in the storage device 790 and/or non-transitory computer-readable media 730 and other programs for controlling system hardware. In some embodiments, virtualization is employed in the computing platform 700 so that infrastructure and resources in the computing platform 700 are shared dynamically. For example, a virtual machine is provided to handle a process running on multiple processors so that the process appears to be using only one computing resource rather than multiple computing resources. In some embodiments, multiple virtual machines are used with one processor.

As can be further seen, an interconnect 705 is also provided to allow for communication between the various components listed above and/or other components not shown. Computing platform 700 can be coupled to a network 750 (e.g., a local or wide area network such as the internet), through network interface circuit 740 to allow for communications with other computing devices, platforms, resources, clients, and Internet of Things (IoT) devices.

In some embodiments, a user interacts with the computing platform 700 through an input/output system 760 that interfaces with devices such as a keyboard and mouse 770 and/or a display element (screen/monitor) 780 which provides a user interface to accept user input and guidance and to provide feedback to the user. In some embodiments, the computing platform 700 includes other I/O devices (not shown) for receiving input from a user, for example, a pointing device or a touchpad, etc., or any suitable user interface. In some embodiments, the computing platform 700 includes other suitable conventional I/O peripherals. The computing platform 700 can include and/or be operatively coupled to various suitable devices for performing one or more of the aspects as variously described in this disclosure.

In some embodiments, the computing platform 700 runs an operating system (OS) 720, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 700 and performing the operations described in this disclosure. In one embodiment, the operating system runs on one or more cloud machine instances.

As will be appreciated in light of this disclosure, the various modules and components of the system, including the streaming mode ALS optimization training and update module 120, factorization machine 140, and batch mode ALS optimization training module 160, as well as submodules thereof, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing platform 700, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Example Embodiments

Numerous example embodiments will be apparent, and features described herein can be combined in any number of configurations.

Example 1 includes a method for training a factorization machine (FM), the method comprising: receiving, by a processor-based system, a current datapoint, the current datapoint including a feature vector, wherein the feature vector includes a user identification, a subject matter identification, and a context; applying, by the processor-based system, an FM to the feature vector to generate an estimated target value, the estimated target value identifying an opinion of the user relative to the subject matter; and updating, by the processor-based system, parameters of the FM for training of the FM, the updating based on an application of a streaming mode alternating least squares (ALS) optimization to the current datapoint, the estimate of the target value, a true target value based on feedback from the user, and an updated summation of intermediate calculated terms generated by application of the streaming mode ALS optimization to previously received datapoints associated with prior parameter updates of the FM.

Example 2 includes the subject matter of Example 1, wherein the current datapoint includes the true target value.

Example 3 includes the subject matter of Examples 1 or 2, further comprising: applying the trained FM to a hypothetical feature vector to generate a predicted target value associated with the hypothetical feature vector; and generating a context aware recommendation based on the predicted target value.

Example 4 includes the subject matter of any of Examples 1-3, wherein the context aware recommendation comprises one or more of a playlist, a product, an advertisement, an event, and an identification of a friend.

Example 5 includes the subject matter of any of Examples 1-4, wherein the context comprises one or more of a location of the user, a mood of the user, a platform associated with the subject matter, and identification of companions of the user.

Example 6 includes the subject matter of any of Examples 1-5, wherein the parameters of the FM comprise a global bias parameter, a plurality of linear weight parameters, and a plurality of interaction parameters.

Example 7 includes the subject matter of any of Examples 1-6, further comprising initializing the FM based on a batch mode application of the ALS optimization to an historical collection of feature vectors and associated target values.

Example 8 is a system to perform training of a factorization machine (FM), the system comprising: one or more processors; an FM at least one of controllable and executable by the one or more processors, and configured to generate an estimated target value based on a feature vector, wherein the feature vector includes a user identification, a subject matter identification, and a context, and wherein the target value identifies an opinion of the user relative to the subject matter, the feature vector and the target value associated with a current received datapoint; and a streaming mode alternating least squares (ALS) optimization module at least one of controllable and executable by the one or more processors, and configured to update parameters of the FM for training of the FM, based on the current received datapoint, the estimate of the target value, and an updated summation of intermediate calculated terms generated by the streaming mode ALS optimization module operating on previously received datapoints associated with prior parameter updates of the FM.

Example 9 includes the subject matter of Example 8, wherein the trained FM is further configured to generate a predicted target value associated with a hypothetical feature vector.

Example 10 includes the subject matter of Examples 8 or 9, wherein the trained FM is further configured to generate a context aware recommendation based on the predicted target value, the context aware recommendation comprising one or more of a playlist, a product, an advertisement, an event, and an identification of a friend.

Example 11 includes the subject matter of any of Examples 8-10, wherein the context comprises one or more of a location of the user, a mood of the user, a platform associated with the subject matter, and identification of companions of the user.

Example 12 includes the subject matter of any of Examples 8-11, wherein the parameters of the FM comprise a global bias parameter, a plurality of linear weight parameters, and a plurality of interaction parameters.

Example 13 includes the subject matter of any of Examples 8-12, further comprising a batch mode ALS optimization module configured to initialize the FM based on a batch mode application of the ALS optimization to an historical collection of feature vectors and associated target values.

Example 14 is a non-transitory computer program product having instructions encoded thereon that when executed by one or more computer processors cause the one or more computer processors to perform a process comprising: receiving a current datapoint, the current datapoint including a feature vector and an associated target value, wherein the feature vector includes a user identification, a subject matter identification, and a context, and wherein the target value identifies an opinion of the user relative to the subject matter; applying an FM to the feature vector to generate an estimate of the target value; and updating parameters of the FM for training of the FM, the updating based on an application of a streaming mode alternating least squares (ALS) optimization to the current datapoint, the estimate of the target value, and an updated summation of intermediate calculated terms generated by application of the streaming mode ALS optimization to previously received datapoints associated with prior parameter updates of the FM.

Example 15 includes the subject matter of Example 14, further comprising applying the trained FM to a hypothetical feature vector to generate a predicted target value associated with the hypothetical feature vector.

Example 16 includes the subject matter of Examples 14 or 15, further comprising generating a context aware recommendation based on the predicted target value.

Example 17 includes the subject matter of any of Examples 14-16, wherein the context aware recommendation comprises one or more of a playlist, a product, an advertisement, an event, and an identification of a friend.

Example 18 includes the subject matter of any of Examples 14-17, wherein the context comprises one or more of a location of the user, a mood of the user, a platform associated with the subject matter, and identification of companions of the user.

Example 19 includes the subject matter of any of Examples 14-18, wherein the parameters of the FM comprise a global bias parameter, a plurality of linear weight parameters, and a plurality of interaction parameters.

Example 20 includes the subject matter of any of Examples 14-19, further comprising initializing the FM based on a batch mode application of the ALS optimization to an historical collection of feature vectors and associated target values.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for training a factorization machine (FM), the method comprising:
    receiving, by a processor-based system, a current datapoint, the current datapoint including a feature vector, wherein the feature vector includes a user identification, a subject matter identification, and a context;
    applying, by the processor-based system, an FM to the feature vector to generate an estimated target value, the estimated target value identifying an opinion of the user relative to the subject matter; and
    updating, by the processor-based system, parameters of the FM for training of the FM, the updating based on an application of a streaming mode alternating least squares (ALS) optimization to
        the current datapoint,
        the estimate of the target value,
        a true target value based on feedback from the user, and
        an updated summation of intermediate calculated terms generated by application of the streaming mode ALS optimization to previously received datapoints associated with prior parameter updates of the FM.

2. The method of claim 1, wherein the current datapoint includes the true target value.

3. The method of claim 1, further comprising: applying the trained FM to a hypothetical feature vector to generate a predicted target value associated with the hypothetical feature vector; and generating a context aware recommendation based on the predicted target value.

4. The method of claim 3, wherein the context aware recommendation comprises one or more of a playlist, a product, an advertisement, an event, and an identification of a friend.

5. The method of claim 1, wherein the context comprises one or more of a location of the user, a mood of the user, a platform associated with the subject matter, and identification of companions of the user.

6. The method of claim 1, wherein the parameters of the FM comprise a global bias parameter, a plurality of linear weight parameters, and a plurality of interaction parameters.

7. The method of claim 1, further comprising initializing the FM based on a batch mode application of the ALS optimization to an historical collection of feature vectors and associated target values.

8. A system to perform training of a factorization machine (FM), the system comprising:
  one or more processors;
  an FM at least one of controllable and executable by the one or more processors, and configured to generate an estimated target value based on a feature vector, wherein the feature vector includes a user identification, a subject matter identification, and a context, and wherein the target value identifies an opinion of the user relative to the subject matter, the feature vector and the target value associated with a current received datapoint; and
  a streaming mode alternating least squares (ALS) optimization module at least one of controllable and executable by the one or more processors, and configured to update parameters of the FM for training of the FM, based on
    the current received datapoint,
    the estimate of the target value, and
    an updated summation of intermediate calculated terms generated by the streaming mode ALS optimization module operating on previously received datapoints associated with prior parameter updates of the FM.

9. The system of claim 8, wherein the trained FM is further configured to generate a predicted target value associated with a hypothetical feature vector.

10. The system of claim 9, wherein the trained FM is further configured to generate a context aware recommendation based on the predicted target value, the context aware recommendation comprising one or more of a playlist, a product, an advertisement, an event, and an identification of a friend.

11. The system of claim 8, wherein the context comprises one or more of a location of the user, a mood of the user, a platform associated with the subject matter, and identification of companions of the user.

12. The system of claim 8, wherein the parameters of the FM comprise a global bias parameter, a plurality of linear weight parameters, and a plurality of interaction parameters.

13. The system of claim 8, further comprising a batch mode ALS optimization module configured to initialize the FM based on a batch mode application of the ALS optimization to an historical collection of feature vectors and associated target values.

14. A non-transitory computer program product having instructions encoded thereon that when executed by one or more computer processors cause the one or more computer processors to perform a process comprising:
  receiving a current datapoint, the current datapoint including a feature vector and an associated target value, wherein the feature vector includes a user identification, a subject matter identification, and a context, and wherein the target value identifies an opinion of the user relative to the subject matter;
  applying an FM to the feature vector to generate an estimate of the target value; and
  updating parameters of the FM for training of the FM, the updating based on an application of a streaming mode alternating least squares (ALS) optimization to
    the current datapoint,
    the estimate of the target value, and
    an updated summation of intermediate calculated terms generated by application of the streaming mode ALS optimization to previously received datapoints associated with prior parameter updates of the FM.

15. The non-transitory computer program product of claim 14, further comprising applying the trained FM to a hypothetical feature vector to generate a predicted target value associated with the hypothetical feature vector.

16. The non-transitory computer program product of claim 15, further comprising generating a context aware recommendation based on the predicted target value.

17. The non-transitory computer program product of claim 16, wherein the context aware recommendation comprises one or more of a playlist, a product, an advertisement, an event, and an identification of a friend.

18. The non-transitory computer program product of claim 14, wherein the context comprises one or more of a location of the user, a mood of the user, a platform associated with the subject matter, and identification of companions of the user.

19. The non-transitory computer program product of claim 14, wherein the parameters of the FM comprise a global bias parameter, a plurality of linear weight parameters, and a plurality of interaction parameters.

20. The non-transitory computer program product of claim 14, further comprising initializing the FM based on a batch mode application of the ALS optimization to an historical collection of feature vectors and associated target values.

* * * * *